United States Patent [19]
Check

[11] Patent Number: 5,450,678
[45] Date of Patent: Sep. 19, 1995

[54] GRASS LENGTH MEASURING DEVICE

[75] Inventor: Joseph M. Check, Shoreview, Minn.

[73] Assignee: Check Signature, Inc., Shoreview, Minn.

[21] Appl. No.: 188,398

[22] Filed: Jan. 27, 1994

[51] Int. Cl.$^6$ .............................................. G01C 15/06
[52] U.S. Cl. ........................................ 33/833; 33/1 H; 172/430; 116/200
[58] Field of Search .............. 33/833, 832, 1 H, 483, 33/492, 293; 172/13, 14, 430; 116/200, 209; 111/901; 239/276

[56] References Cited

U.S. PATENT DOCUMENTS

| | | |
|---|---|---|
| 79,133 | 6/1868 | Kirkpatrick . |
| 1,591,509 | 7/1926 | Brookman . |
| 1,843,108 | 5/1930 | Clayden . |
| 2,722,055 | 11/1955 | Rader ........................ 33/483 |
| 3,495,352 | 12/1967 | Sbare . |
| 3,511,210 | 5/1970 | Layman . |
| 3,973,327 | 8/1976 | Cardinale ..................... 33/1 H |
| 4,433,490 | 2/1984 | Black ........................... 33/293 |
| 5,325,798 | 7/1994 | Nowell et al. ................. 33/1 H |
| 5,333,391 | 8/1994 | Eldridge et al. .............. 33/1 H |

Primary Examiner—Christopher W. Fulton
Attorney, Agent, or Firm—Jean Seaburg; James E. Olds

[57] ABSTRACT

The Grass Length Measuring Device is a hand tool for use by groundskeepers to more precisely measure the height of grass growing above the soil. The tool is configured as a tool body having two or more soil penetrating points and a plurality of soil surface reference teeth projecting outwardly from the tool body. The soil penetrating points are sharp and readily penetrate the soil under moderate hand pressure. The soil surface reference teeth have blunt tips that, under moderate hand pressure, will readily push aside the thatch but will not readily penetrate the soil. The soil reference teeth rests upon the soil surface and establishes a soil surface reference. One or more gauge surfaces on the tool body are aligned with the soil surface reference to permit measurement of grass height above soil. The arrangement of the soil reference teeth with respect to the soil penetrating points provides an accurate soil surface reference and permits the height of the growing grass to be measured with a greater degree of precision than attained in a single measurement with other devices.

13 Claims, 3 Drawing Sheets

GRASS LENGTH MEASURING DEVICE

FIELD OF THE INVENTION

The present invention relates generally to hand tools and more specifically to hand held gauges. In its particular aspects, the invention relates to hand held gauges for use in measuring the height of grass on golf courses, race tracks and other areas in which it is desired to maintain grass at a predetermined height.

BACKGROUND OF THE INVENTION

The care and cutting of the grasses is one of the most costly and time consuming aspects of golf course maintenance. The grasses provide the playing surface for the game as well as a beautiful and relaxing setting for recreational activity. Golf courses typically have several different varieties of grass growing in the various areas. These grasses are maintained at specific heights for tournament play and for recreational play. The equipment used to cut the grass is not only expensive but also costly to operate. Typically, the golf course superintendent will tour the golf course periodically and spot check the grass height on the greens, fairways and roughs with a ruler or by visual observation. For example, fanning is one method of visual observation. Fanning is the process of brushing of one's hand over the top of the grass to estimate grass height.

The precision of the measurements taken on the fairways and roughs is adversely affected by variations in the soil surface and by the accumulation of thatch, i.e. dried grass clipping and organic matter accumulated at the base of the grass stems. Mowing assignments are based upon relatively few measurements. Further mower height usually is set on a shop floor or other surface which exhibits less surface variation than the soil underlying the fairways, the primary roughs and the secondary roughs. Not surprisingly, much of the mowing done accomplishes little more than fanning the grass.

For example, fanning the grass with a mower may occur when a golf course superintendent, after touring the golf course generally and making occasional visual inspections of isolated spots, instructs the mower operator to cut the 6th fairway to a desired height of two inches with a maximum permissible height of four inches. Upon reaching the 6th fairway, the operator discovers that in fact the fairway grass height is close to but still under four inches. An operator who proceeds to cut the fairway at four inches because he was told to even though no grass is actually being cut is said to be just fanning the grass. The useless wear and tear on expensive mowing equipment and time in operation when just fanning by mower, multiplied by the numerous cuttings throughout the grass growing season amounts to a significant and undesirable waste of time and money.

A ruler is not a suitable tool for measuring grass height because it measures the height of the grass at only a small area, essentially at a point. In order to obtain a precise measurement of grass height using a ruler, one must average a number of measurements. Other hand measuring tools, such as the gauge proposed by John Cardinale (U.S. Pat. No. 3,973,327), also establish a soil reference by bringing the narrow edge of a gauge into contact with the soil surface. The elongated Cardinale gauge, like the ruler, measures grass height in a small area approximating a single point and a number of measurements must be averaged to obtain a precise measurement of grass height. Like the ruler, the Cardinale gauge may come to rest against a layer of thatch, a twig or other debris thereby throwing off the accuracy of the measurement.

The precision of the measurements made with such devices is also adversely affected by variations in the underlying soil surface. While such tools may measure with sufficient precision for ordinary home lawn care, they do not provide the degree of precision needed for golf course maintenance and other applications in which greater precision is required.

OBJECTS OF THE INVENTION

An object of the present invention is to provide a hand held gauge for the measure of the height of growing grass.

A further object of the present invention is to provide a gauge that establishes a soil surface reference and therefore yields a more precise measurement of grass height.

A further object of the present invention is to provide a method of measuring a grass playing surface so that uniform, safe playing conditions can be provided for golf, lawn tennis, turf horse racing, football, baseball and other sports played in whole or in part on a natural grass surfaces.

A further object of the present invention is to provide a gauge which can be carried and used by a lawn mower operator to determine the height of cut actually being achieved and to provide a reasonably precise measurement for adjusting the blade height to achieve the desired height of cut grass.

SUMMARY OF THE INVENTION

The objects of the invention are satisfied by providing a hand held gauge tool which is useful to groundskeepers, schools of horitculture and agronomy and others who desire a more accurate device for measuring the length of grass.

It is an advantage of this invention that when the tool is pressed onto an irregular ground surface the tool may still define an accurate soil surface reference line which is a rough, mechanically produced average of the peaks, valleys and variations in the soil surface.

It is a feature of this invention to position soil reference teeth in a sufficient width apart from and in relation to the sides of adjacent soil reference teeth to accommodate small pebbles, twigs, protruding tips of predominately buried rocks, and other irregular objects which provides a more accurate grass length measurement. The width between the soil reference teeth feature helps resolve the problem of misleading grass measurements because the invention avoids those unseen yet misleading objects which give some traditional measurement devices an inaccurate starting point of measurement, namely an inaccurate soil surface reference. The width of reference teeth feature helps the tips of the soil reference teeth to properly abut and align with the soil surface, provides an average horizontal pitch across the peaks, valleys, and other variations in the soil surface, and provides a more accurate base measuring point along the soil surface reference line for making a more accurate actual grass length measurement.

It is a further advantage of this invention that when the hand tool is pressed onto an irregular ground surface, the tool shape helps the operator feel the proper depth at which to place the tool as the proper starting point for obtaining a reliable grass length measurement.

It is a another feature of this invention to blunt the tips of soil reference teeth sufficiently wide enough to provide the operator who is inserting the tool with a feeling of where the actual soil surface is and yet having teeth sufficiently tapered to slide past and not rest upon dense thatch, small pebbles, twigs, and other irregular objects. The blunt tip and tapered soil reference teeth feature helps resolve some of the problems of misleading grass measurements in other prior art devices. If the soil reference tooth tip was made sharper, then the soil reference teeth would be pushed in below the soil surface too deep. If the soil reference tooth tip was made wider, then the soil reference teeth would be pushed down and come to rest upon dense thatch or other irregular objects at a depth above the desired soil surface reference. The blunt tip and tapered soil reference teeth feature provides a more accurate depth at which to place and begin measurement with the soil surface reference for a more accurate actual grass length measurement.

The body of the tool has a grip end and an insertion end. The grip end provides a surface which easily can be grasped in the human hand. The grip end also provides a surface for receiving a force exerted by the human hand, where it could be along one side, both sides, or opposite the insertion end. Two or more soil penetrating points extend outwardly from the insertion end of the tool body. These soil penetrating points are relatively sharp so that moderate hand pressure exerted on the grip end is sufficient to force the soil penetrating points into the soil.

A number of soil surface reference teeth extend outwardly from the insertion end of the tool body. The soil surface reference teeth are arranged in proximity to the soil penetrating points. The soil reference teeth are spaced so that there is a gap, or spacing, between each of the soil reference teeth. The tips of the soil surface reference teeth, i.e. the outward most portion of each tooth, are relatively blunt and will not penetrate the soil as readily as the soil penetrating points.

The tool is used by bringing the soil penetrating points into contact with the soil. The soil penetrating points extend outwardly from the tool body a greater distance than the soil reference teeth. Moderate hand pressure exerted on the grip end causes the soil penetrating points to slide smoothly into the soil and the soil reference teeth to move downwardly through the grass and thatch toward the soil. The tips of the soil reference teeth cause the grass, thatch and small loose objects such as twigs to be forced into the gaps between the soil surface reference teeth. When the soil reference teeth come into contact with the soil, the hand pressure required to push the tool into the soil will increase abruptly. The soil surface reference teeth will then touch, or be in very close proximity to, the surface of the soil. The number of the soil surface reference teeth and the size of the tool are such that the tips of the teeth in effect average out the soil surface variation and provide an accurate reference datum for the measurement of the height of the grass above the soil surface.

At least one gauge surface is positioned relative to the reference datum defined by the tips of the soil reference teeth (5). The gauge surface is marked with graduated rulings, color coded bands or other indicia spaced at predetermined intervals above the soil surface reference for measuring the height of the grass.

When inserted into the soil, the gauge is supported by the soil penetrating points and the grass to be measured stands up alongside the gauge surface. The person making the measurement can then move back from the tool and sight along the tops of the grass blades toward the gauge surface to determine the height of the grass. The invention thus provides a reasonably precise measurement of the height with only one measurement.

DETAILED DESCRIPTION

Figure 1:
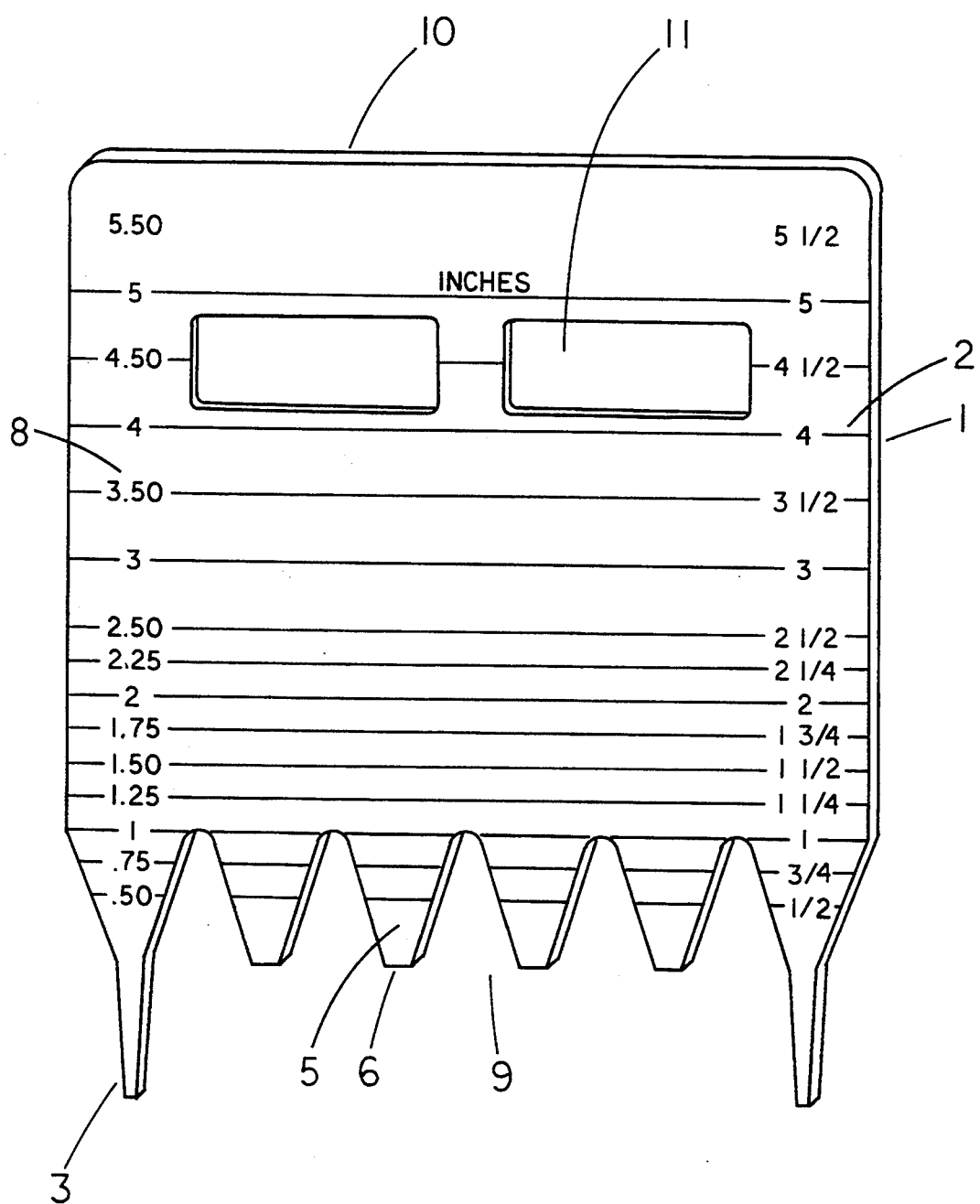
FIG. 1 is a perspective drawing an embodiment of the invention.

FIG. 1 illustrates a preferred embodiment of the present invention. A tool body (1) is manufactured from a sheet or plate of material. In a preferred embodiment, the tool body is in color and is made of a molded plastic such as Dow 9555 ABS material. Other color schemes and materials will work also. The overall length of the invention is approximately equal to the overall height of the invention as illustrated in FIG. 1. Specifically, in a preferred embodiment the overall dimensions are a width of 6 inches, a depth of 3/16th of and inch and a height, from the tip (6) of a soil reference tooth (5) to the edge of the grip end (10) is 7 inches.

A gauge surface (2) is included on the front face of the tool body (1). In this embodiment a second gauge surface may be included on the reverse face of the tool body (1). The gauge surface is marked with indicia (8). The gauge surface and the indicia are described in greater detail below.

The tool body (1) has a grip end (10) and an insertion end (9) opposite the grip end. The grip end (10) of the tool body (1) can be easily grasped with the human hand. Two apertures (11) provide openings passing through the tool body near the grip end. The tool body can be easily grasped in the hand by extending the first and second fingers through one aperture and the ring and little fingers through the other aperture form the gauge surface side of the tool body while placing the palm against the edge of the of the grip end (10) and extending the thumb along the reverse side of the tool body. While the preferred embodiment illustrated in FIG. 1 shows two apertures, any arrangement of apertures, sufficient in size and number to accommodate the fingers, will satisfy the requirements of the invention. However, the apertures (11) should be located a sufficient distance from the edge of the grip end so that the palm rests comfortably against the edge of the grip end and so that the palm, and not the back of the fingers, contacts the tool body when force is exerted to insert the tool. While apertures (11) provide a convenient and appropriate hand grip, the preferred embodiment shown in FIG. 2, manufactured without apertures, is also reasonably easy to use.

Figure 2:
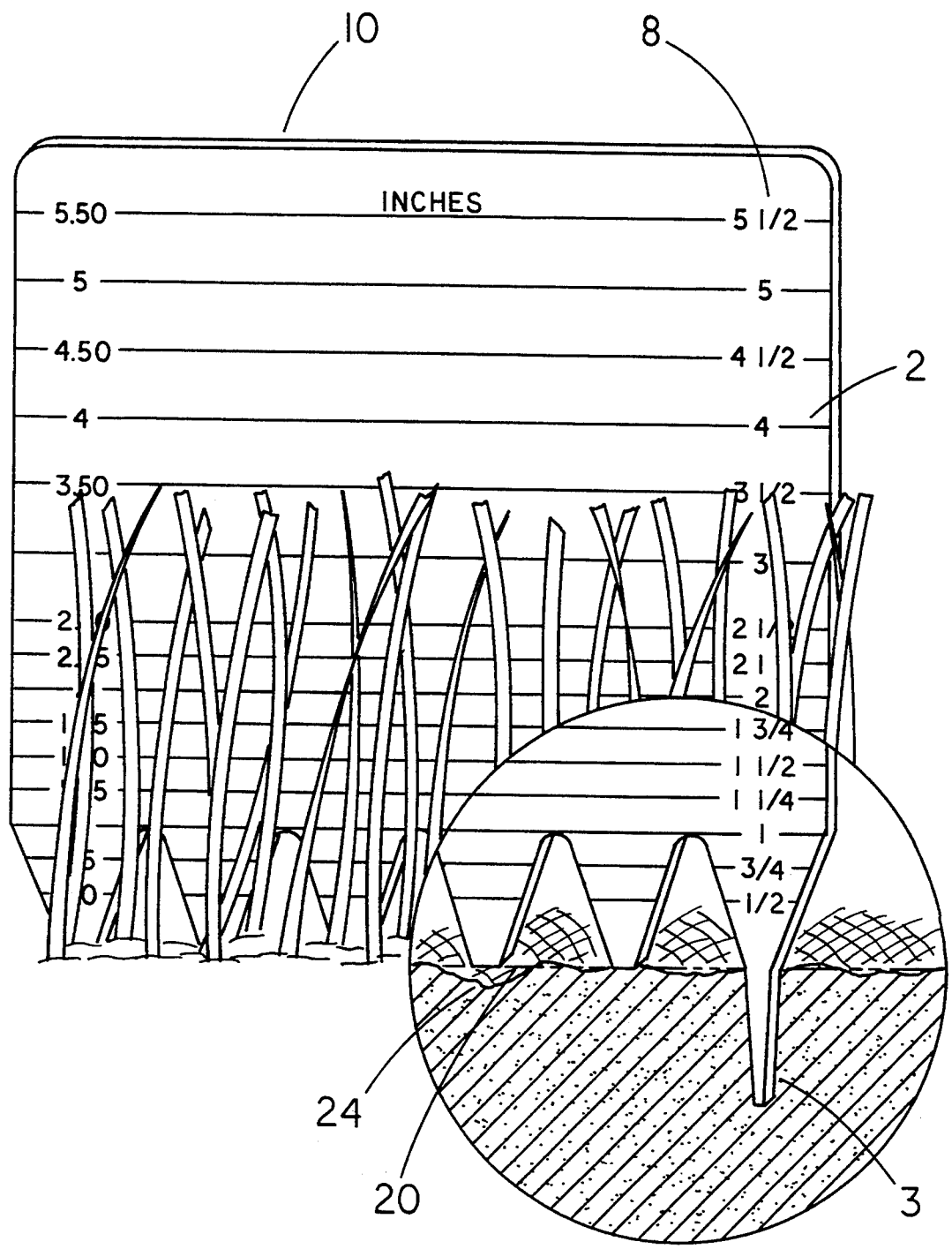
FIG. 2 is a cutaway view of the invention inserted in growing grass.

The insertion end (9) of the tool body is illustrated in FIG. 1 and FIG. 2. In the preferred embodiment disclosed in FIG. 1, a soil penetrating point (3) extends outwardly form each side of the insertion end. A plurality of soil reference teeth (5) are arranged at spaced intervals between the soil penetrating points and extend outwardly from the insertion end. The soil reference teeth have tips (6) which are blunt. The invention requires a spacing between the soil reference teeth so that when the tool is inserted into the soil, grass, clippings, thatch and other material present on the surface of the soil will be forced into the spaces between the teeth.

It is a feature of this invention to position soil reference teeth a sufficient width apart from and in relation to the sides of adjacent soil reference teeth to accommodate small pebbles, twigs, protruding tips of predominately buried rocks, and other irregular objects which provides a more accurate grass length measurement. The width between the soil reference teeth (5) feature helps resolve the problem of misleading grass measurements because those unseen yet misleading objects which give some traditional measurement devices an inaccurate starting point of measurement, specifically an inaccurate soil surface reference (20), are avoided by this invention. The width of reference teeth feature permits the bottom of the soil reference teeth (5) to properly abut and align with the relevant soil slope and defines a more accurate soil surface reference (20) for a more accurate actual grass length measurement.

In the preferred embodiment illustrated in FIG. 1, how the spacing is achieved by the shape of the teeth is shown. The soil reference teeth are shaped so that each tooth tapers from a relatively large cross sectional area at the base of the tooth adjacent to the insertion end to a relatively small cross sectional area adjacent the tip. However, the soil reference teeth may be of any blunt tipped shape and spacing without departing from the requirements of the invention so long as adequate spacing is provided between the teeth to accommodate the grass, clippings, thatch and other small objects which may be pushed aside when the tool is inserted into the soil.

FIG. 2 shows a preferred embodiment of the tool inserted into the soil and in position for measuring the grass. The soil penetrating points (3) have been thrust into the soil. The soil reference teeth (5) have come into sufficient contact and proper alignment with the soil which thereby defines an accurate soil surface reference (20).

The insertion of the tool into the soil requires only moderate hand pressure. To insert the tool, the soil penetrating teeth are first brought into contact with the soil. The tool then is brought into position so that it is perpendicular to the surface of the soil. Moderate hand force is then exerted on the grip end (10) by the person using the tool. The soil penetrating points (3) are longer than the soil reference teeth and have sharp ends.

Therefore, the tool slides into the soil easily with only moderate resistance being sensed by the person operating the tool. When the soil reference teeth come into contact with the soil, the resistance felt by the operator increases abruptly. Since the soil does not present a perfectly smooth surface, the teeth strike or fall between the high points as illustrated in FIG. 2. Although the soil reference teeth are blunt, they will slightly compress ridges and peaks, as well as extend into any small valleys or depressions in the soil. The result is that the soil surface reference (20) defined by the soil reference teeth is neither the highest spot nor the lowest point of the soil surface under the tool, but a datum which is a rough, mechanically produced average of the peaks, valleys and variations in the soil surface. The length of the tool and the number of teeth required to produce this averaging effect depends upon the smoothness of the underlying soil surface. A tool that is approximately 6" to 8" in length with four soil reference teeth, as depicted in the preferred embodiments shown in FIGS. 1 and 2, has proved acceptable for use on golf course fairways, roughs and secondary roughs.

The soil reference teeth shown in FIG. 1 are tapered, as described above, to permit the teeth to push through the grass and thatch and reach the soil surface. A tip (6) having a relatively smaller cross sectional area with a greater degree of taper is required to penetrate relatively dense stands of grass while a tip having a relatively larger cross sectional area and smaller degree of taper is sufficient for relatively sparse stands of grass. Further, the length of the soil reference teeth is dependent upon the density of the grass and the desired height of the grass. A 6" tool having four soil reference teeth approximately 1" in length and tapered so that the ratio of the cross sectional area of the tooth adjacent the insertion end to the cross sectional area of the tooth adjacent the tip is approximately 7:3 has proved appropriate for use on golf course fairways, roughs and secondary roughs. More specifically, in a preferred embodiment the approximate distance is one inch between the center point of each tip (5) of each soil reference tooth (6). Each tip (6) of a soil reference tooth is 3/16th of an inch in width and in depth. The gap formed between each of the soil reference teeth (5) and each soil penetrating points (3) is approximately the same size and triangular in shape. Each triangular gap has an approximate height of one inch, a width at the base of about 13/16th of an inch and a width at the apex of about 3/16th of an inch.

Figure 3:
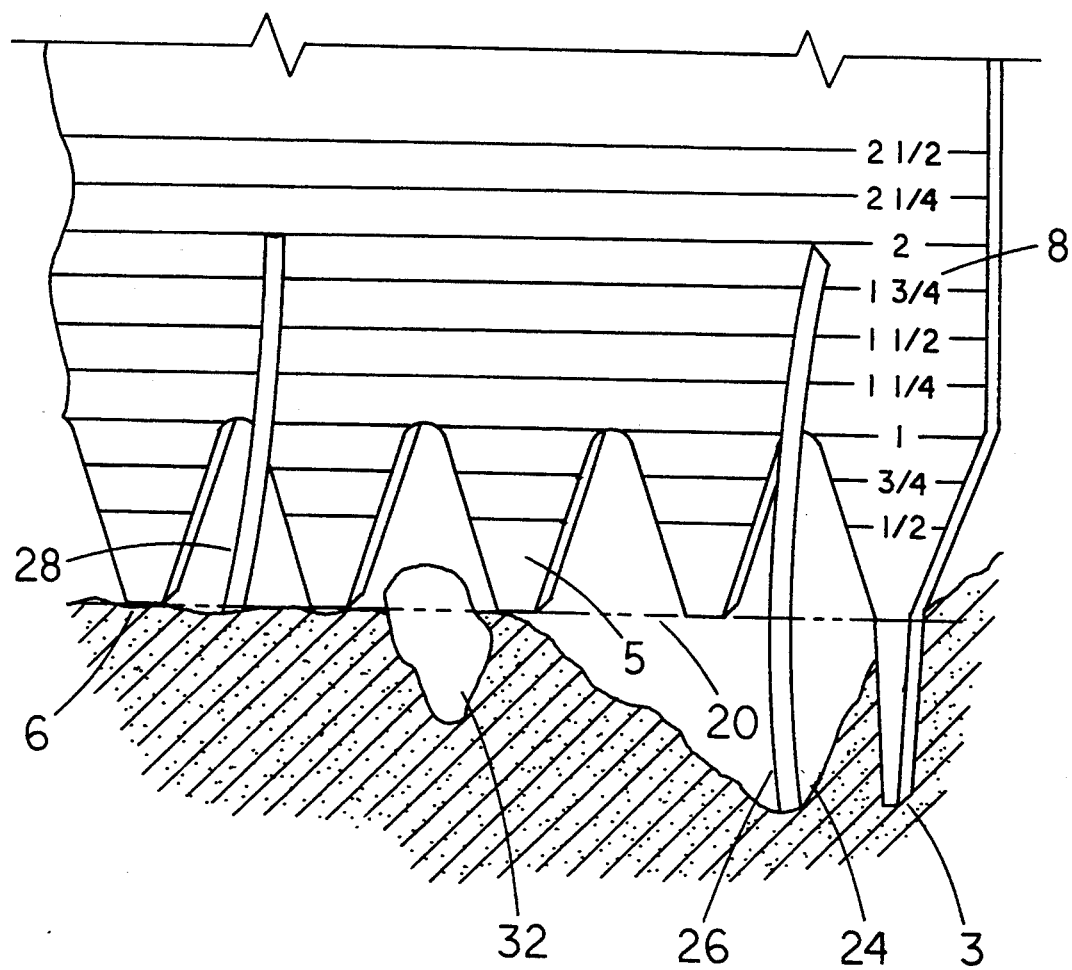
FIG. 3 is a partial and enlarged view of the invention placed next to two different length blades of grass and over an irregular soil surface and over a partially protruding rock.

FIG. 3 illustrates a partial and enlarged view of the invention placed next to two different length blades of grass. For example, a blade of grass (28) could be two inches tall and blade of grass (26) could be three inches tall. The soil surface (24) is shown to be irregular. A ruler measurement in the valley where the blade of grass (26) is would give a grass height reading of three inches. A ruler measurement in the blade of grass (28) would give a grass height reading of two inches. Measuring grass height with a ruler or similarly flat bottom devices over the area of the partially protruding rock (32) could give an inaccurate measurement. Measuring with the hand tool invention gives more accurate measurements because the protruding rock (32) fits between the soil reference teeth (5).

Another feature of this invention is to blunt the tips of soil reference teeth sufficiently wide enough to provide the operator who is inserting the tool with a feeling of where the actual soil surface is and yet having teeth sufficiently tapered to slide past and not rest upon dense thatch, small pebbles, twigs, and other irregular objects. The blunt tip and tapered soil reference teeth feature helps resolve some of the problems of misleading grass measurements in other prior art devices. If the soil reference tooth tip was made sharper, then the soil reference teeth would be pushed in below the soil surface too deep. If the soil reference tooth tip was made wider, then the soil reference teeth would be pushed down and come to rest upon dense thatch or other irregular objects at a depth above the desired soil surface reference. The blunt tip and tapered soil reference teeth feature provides a more accurate depth at which to place and begin soil surface reference for a more accurate actual grass length measurement. The tool body has at least one gauge surface (2). Indicia (8) are placed upon the gauge surface at predetermined distances form the soil surface reference. The indicia (8) depicted in FIGS. 1 and 2 are lines parallel to, and spaced at half-inch intervals from the soil surface reference. In a preferred embodiment, the indicia (8) have lines marked at each end with numbers. The first line is marked ½, the next line is marked ¾ as so on in the sequence of 1, 1¼, 1½, 1¾, 2, 2¼, 2½, 3, 3½, 4, 4½, 5, 5½. The indicia (8) could also have other convenient units of measurements and different measurement systems such as metric in addition to English. For example, the gauge surface indicia (8) may depict additional increments of ⅛ inch, ¼ inch or 1 centimeter. The lines are shown collinear in the preferred embodiment; of course, the indicia need to be only reasonably straight for accurate reading of grass height. However, the indicia might also be bands of contrasting colors coded to indicate whether the grass is too short, too long or of acceptable length; the indicia might also be at intervals approximating one day's growth; the indicia might be a combination of colored bands and parallel lines.

The indicia may be placed upon the tool body by silk screening, inscription, embossing or any other method that is appropriate to the material from which the tool body is manufactured and compatible with the process used to manufacture the tool body. If the tool body is manufactured with two or more gauge surfaces, each gauge surface may have an indica that is the same as, or different from the indicia appearing on any other gauge surface.

Further, the tool body depicted in the drawings has been fashioned from a sheet or plate of material. However, a tool body manufactured from cylindrical material in the shape of a pipe or bar, or a tool body manufactured from a multifaceted prism of material would meet all requirements of the invention.

While a number of equivalent structures have been mentioned and described herein, there are many equivalent structures which meet the requirements of the present invention and which are obvious in light of the disclosures made herein. For example, collinear lines are shown in the preferred embodiment but other indicia could be used.

I claim:

1. A method of measuring the height of grass growing above a soil surface comprising:
    constructing a hand tool having an insertion end, a grip end, at least one gauge surface with spaced measuring indicia thereon located, a plurality of spaced soil reference teeth extending outwardly from the insertion end of said hand tool and blunted sufficiently wide enough to provide the hand tool operator with an indication of where the soil surface is and blunted sufficiently narrow enough to divert aside between said soil reference teeth, objects upon or irregularities of the soil surface, said indicia being positioned at desired distances from the outward most points of said soil reference teeth, and at least two soil penetrating points extending outwardly from said insertion end,
    grasping said hand tool by its grip end,
    inserting said hand tool into the growing grass and bringing said soil penetrating points into contact with the soil,
    holding said hand tool perpendicular to the soil surface,
    applying force on said grip end, while continuing to hold said hand tool perpendicular to said soil surface, thereby forcing said soil penetrating points into the soil,
    continuing said application of force on said grip end until said soil reference teeth are brought to rest against the soil, thereby defining a soil surface reference line,
    sighting across the grass toward said indicia on said gauge surface of said tool body, and
    measuring the height of the grass by visually comparing the grass to said indicia.

2. A hand tool for inserting into growing grass and measuring the height of the grass growing above the surface of the soil comprising:
    a tool body having least one gauge surface, an insertion end and a grip end, said grip end being of size and shape convenient for being grasped by hand, said insertion end being located opposite said grip end whereby said tool body may be grasped by hand and said insertion end may be inserted into growing grass;
    a plurality of soil reference teeth adjacent to said insertion end, each soil reference tooth having a tip projecting outwardly in excess of 0.5 inch from said insertion end, said tips of said soil reference teeth defining a soil surface reference line so that when said insertion end is inserted into growing grass and said tips abut a soil surface, then said soil surface line provides an average horizontal pitch across the peaks, valleys, and other variations in the soil surface and provides a base point for measuring grass height;
    collinear indicia being placed at predetermined distances from and parallel to said soil surface reference line, for measuring the height of the grass above the soil surface; and
    said tips of said soil reference teeth being blunted sufficiently wide enough to provide the hand tool operator with an indication of where the soil surface is and blunted sufficiently narrow enough to divert aside between said soil reference teeth, objects upon or irregularities of the soil surface.

3. The hand tool of claim 2 wherein said soil reference teeth are tapered so that the cross sectional area of each of said teeth is greatest adjacent said tool body and least adjacent said tip whereby irregularities of and objects upon the soil surface are substantially forced out from under said tips of said soil reference teeth to in between said soil reference teeth.

4. The hand tool of claim 3 further comprising:
    at least one soil penetrating point adjacent to, and projecting outwardly from, said insertion end of said tool body.

5. The hand tool of claim 4 wherein each of said soil penetrating points is located adjacent to at least one of said soil reference teeth.

6. The hand tool of claim 5 wherein each of said soil penetrating points extends outwardly from said insertion end a greater distance than all of said soil reference teeth.

7. The hand tool of claim 2 wherein said tool body is generally plate shaped and each of said gauge surfaces is generally planar.

8. The hand tool of claim 3 wherein said tool body is generally plate shaped and each of said gauge surfaces is generally planar.

9. The hand tool of claim 4 wherein said tool body is generally plate shaped and each of said gauge surfaces is generally planar.

10. The hand tool of claim 9 wherein said tool body defines at least one aperture proximate to said grip end and extending through said tool body for use as a hand grip.

11. A hand tool for inserting into growing grass and measuring the height of the grass growing above the surface of the soil comprising:
- a tool body having least one gauge surface, an insertion end and a grip end, said grip end being of size and shape convenient for being grasped by hand, said insertion end may be inserted through growing grass to the soil surface;
- a plurality of soil reference teeth adjacent to said insertion end, each soil reference tooth having a tip projecting outwardly approximately 0.5 inch from said insertion end, said tips of said soil reference teeth defining a soil surface reference line so that when said insertion end is inserted into growing grass and said tips abut a soil surface, then said soil surface line provides an average horizontal pitch across the peaks, valleys, and other variations in the soil surface and provides a base point for measuring grass height;
- indicia in substantial linear alignment being placed at a predetermined distance from and parallel to said soil surface reference line, for measuring the height of the grass above the soil surface; and
- said tips of said soil reference teeth being blunted sufficiently wide enough to provide the hand tool operator with an indication of where the soil surface is and blunted sufficiently narrow enough to divert aside between said soil reference teeth, objects upon or irregularities of the soil surface.

12. The hand tool of claim 11 further comprising:
- at least one soil penetrating point adjacent to, and projecting outwardly from, said insertion end of said tool body.

13. A hand tool for inserting into growing grass and measuring the height of the grass growing above the surface of the soil comprising:
- a tool body having least one gauge surface, an insertion end and a grip end, said grip end being of size and shape convenient for being grasped by hand, said insertion end may be inserted into growing grass;
- a plurality of soil reference teeth adjacent to said insertion end, each soil reference tooth having a tip projecting outwardly greater than 0.5 inch from said insertion end, said tips of said soil reference teeth defining a soil surface reference line so that when said insertion end is inserted into growing grass and said tips abut a soil surface, then said soil surface line provides an average horizontal pitch across the peaks, valleys, and other variations in the soil surface and provides a base point for measuring grass height;
- indicia in substantial linear alignment being placed at predetermined distances from and parallel to said soil surface reference line, for measuring the height of the grass above the soil surface; and
- said tips of said soil reference teeth being blunted sufficiently wide enough to provide the hand tool operator with an indication of where the soil surface is and blunted sufficiently narrow enough to divert aside between said soil reference teeth, objects upon or irregularities of the soil surface.

* * * * *